United States Patent
Rolf

(10) Patent No.: US 9,689,690 B2
(45) Date of Patent: Jun. 27, 2017

(54) INDEXING ROUTES USING SIMILARITY HASHING

(71) Applicant: HERE Global B.V., Veldhoven (NL)

(72) Inventor: Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/797,794

(22) Filed: Jul. 13, 2015

(65) Prior Publication Data
US 2017/0016733 A1 Jan. 19, 2017

(51) Int. Cl.
| G01C 21/34 | (2006.01) |
| G06F 17/30 | (2006.01) |
| G01C 21/36 | (2006.01) |
| G06F 3/041 | (2006.01) |
| G01C 21/30 | (2006.01) |
| G01C 21/00 | (2006.01) |
| G09B 29/10 | (2006.01) |
| G01C 21/32 | (2006.01) |
| G01C 21/26 | (2006.01) |

(52) U.S. Cl.
CPC .......... *G01C 21/34* (2013.01); *G01C 21/343* (2013.01); *G06F 17/30628* (2013.01); *G06F 17/30702* (2013.01); *G01C 21/00* (2013.01); *G01C 21/26* (2013.01); *G01C 21/30* (2013.01); *G01C 21/32* (2013.01); *G01C 21/3446* (2013.01); *G01C 21/3461* (2013.01); *G01C 21/3469* (2013.01); *G01C 21/3484* (2013.01); *G01C 21/36* (2013.01); *G01C 21/367* (2013.01); *G01C 21/3611* (2013.01); *G06F 3/041* (2013.01); *G06F 17/30* (2013.01); *G06F 17/30241* (2013.01); *G09B 29/106* (2013.01)

(58) Field of Classification Search
CPC .... G01C 21/36; G01C 21/3484; G01C 21/00; G01C 21/30; G01C 21/32; G01C 21/3469; G01C 21/3446; G01C 21/34; G01C 21/367; G01C 21/3611; G06F 3/041; G06F 17/30628; G06F 17/30702; G06F 17/30; G06F 17/30241; G09B 29/106

See application file for complete search history.

(56) References Cited

U.S. PATENT DOCUMENTS

| 7,512,487 B1 * | 3/2009 | Golding ................ G01C 21/36 701/424 |
| 8,768,626 B1 | 7/2014 | Ganesh |

(Continued)

OTHER PUBLICATIONS

G. Pang et al., Adaptive Route Selection for Dynamic Route Guidance System Based on Fuzzy-Neural Approaches, 1999, University of Hong Kong.

(Continued)

*Primary Examiner* — Behrang Badii
(74) *Attorney, Agent, or Firm* — Lempia Summerfield Katz LLC

(57) ABSTRACT

A method and apparatus for indexing routes using similarity hashing. In an embodiment, a processor identifies a route wherein the route includes one or more links. The processor identifies a route attribute wherein the route attribute describes the route. The processor hashes the one or more links to determine a minimum link with a minimum hash value. The processor assigns the route attribute to the minimum link.

20 Claims, 9 Drawing Sheets

(56) References Cited

U.S. PATENT DOCUMENTS

| | | | |
|---|---|---|---|
| 8,972,187 B1* | 3/2015 | Steinmetz | G01C 21/00 701/533 |
| 2003/0093217 A1 | 5/2003 | Petzold et al. | |
| 2005/0015197 A1 | 1/2005 | Ohtsuji et al. | |
| 2007/0211705 A1* | 9/2007 | Sunstrum | H04L 29/06027 370/356 |
| 2007/0244632 A1* | 10/2007 | Mueller | G01C 21/3446 701/533 |
| 2009/0005965 A1 | 1/2009 | Forstall et al. | |
| 2009/0046111 A1* | 2/2009 | Joachim | G01C 21/367 345/660 |
| 2009/0187538 A1* | 7/2009 | Grun | G01C 21/32 |
| 2010/0205060 A1 | 8/2010 | Athsani et al. | |
| 2011/0038594 A1* | 2/2011 | Symons | G11B 20/00086 386/224 |
| 2012/0066232 A1* | 3/2012 | Engelhardt | G01C 21/32 707/748 |
| 2012/0203459 A1* | 8/2012 | Spindler | G01C 21/32 701/533 |
| 2014/0156185 A1* | 6/2014 | Lange | G01C 21/3469 701/527 |
| 2014/0244170 A1 | 8/2014 | Lerenc | |
| 2014/0278064 A1 | 9/2014 | Lee et al. | |
| 2015/0066355 A1 | 3/2015 | Siegel et al. | |
| 2016/0076896 A1* | 3/2016 | Konig | G01C 21/26 701/411 |
| 2016/0209228 A1* | 7/2016 | Golding | G01C 21/3484 |
| 2016/0315993 A1* | 10/2016 | Li | H04L 43/087 |

OTHER PUBLICATIONS

G. Pang et al., Route Selection for Vehicle Navigation and Control, 2007, University of Hong Kong.

Carlos H C Teixeira et al:, "Min-Hash Fingerprints for Graph Kernels: A Trade-o among Accuracy, Eciency, and Compression", Oct. 3, 2012, Retrieved from the Internet: URL: http://homepages.dcc.ufmg.br/~carlos/papers/sbbd/sbbd12.pdf, pp. 1-10, [retrieved on Dec. 12, 2016].

Cohen E et al: "Finding interesting associations without support pruning", Data Engineering, 2000. Proceedings. 16th International Conference on San Diego, CA, USA Feb. 29-Mar. 3, 2000, Feb. 29, 2000, pp. 489-500.

European Search Report for related European Application No. 16178893 dated Mar. 24, 2017.

European Search Report for related European Application No. 16178893.0 dated Feb. 14, 2017.

* cited by examiner

| LINK | LINK REF. No. | LINK HASH 1 | ROUTE ATTRIBUTE VALUE 1 | ROUTE ATTRIBUTE VALUE 2 |
|---|---|---|---|---|
| AB | 0001 | 0.2200 | 4 | 8 |
| BC | 0002 | 0.0330 | 1 | 8 |
| BH | 0003 | 0.0524 | 8 | 1 |
| CE | 0004 | 0.0111 | 1 | 2 |
| CD | 0005 | 0.4500 | 2 | 8 |
| EF | 0006 | 0.6790 | 1 | 3 |
| DH | 0007 | 0.0443 | 1 | 7 |
| HG | 0008 | 0.8930 | 5 | 5 |
| FG | 0009 | 0.9343 | 1 | 2 |
| GJ | 0010 | 0.6553 | 4 | 8 |

501

INDEXING ROUTES USING SIMILARITY HASHING

FIELD

The following disclosure relates to routing and navigation systems.

BACKGROUND

Navigational systems are used to map out routes from a starting point to a destination point. Routes are generally created from a list of road links or nodes. A typical navigational system offers a user several choices for which route to take. These choices generally include the shortest distance, the quickest transit time, or the least expensive (e.g., toll avoidance).

Navigational systems can create routes based on the shortest distance or time in part due to algorithms such as the traveling salesperson problem or other optimization. Navigational systems may also provide additional information such as landmarks and or traffic conditions (for example lights/stop signs etc.). Navigational systems contain millions of road links and nodes from which routes may be generated. The number of routes that are possible is impossibly large.

SUMMARY

In an embodiment, a processor identifies a route wherein the route includes one or more links. The processor identifies a route attribute wherein the route attribute describes the route. The processor hashes the one or more links to determine a minimum link with a minimum hash value. The processor assigns the route attribute to the minimum link.

In an embodiment, an apparatus comprising at least one processor and at least one memory including computer program code for one or more programs. The at least one memory and the computer program code configured to, with the at least one processor, cause the apparatus to at least perform: identify a route, wherein the route includes one or more links, identify a route attribute, wherein the route attribute describes the route, hash the one or more links to determine the minimum link with a minimum hash value, and assign the route attribute to the minimum link.

A non-transitory computer readable medium including instructions that when executed are operable to: identify a route, wherein the route includes one or more links, identify a route attribute, wherein the route attribute describes the route; hash the one or more links to determine a minimum link with a minimum hash value; and assign the route attribute to the minimum link.

BRIEF DESCRIPTION OF THE DRAWINGS

Exemplary embodiments of the present invention are described herein with reference to the following drawings.

DETAILED DESCRIPTION

Different routes may offer additional benefits to users. The shortest route (or least expensive) is not always the preferred route for every user. A user may prefer a scenic route to work or may be on vacation and not be in a rush. Routes such as these may be found in a guide book or discovered by chance. These routes may be also be tagged or described by individual users. Routes may be rated by different users or labeled with certain attributes such as "no traffic" or "scenic". These routes are static and cannot be altered or updated without potentially losing their value to a user. These routes must have static starting points, static destination points, and contain the same segments from one description to another description. These routes are also limited in their coverage as they may only describe a few out of the infinite number of potential routes. These routes are also not scored or ranked and as such, a search for a "no traffic" or "scenic" route may return multiple results with no clear difference.

Users may recommend certain routes they drive for a certain purpose. For example, a user might just have driven a certain route and recommend it as "scenic" or nice for "bicycles", or just "preferred in general (popular)". Later, a second user asks for a "scenic" or "bicycle-nice" or "popular" between A and B. If the route is the exact same route as the original route, the second user may be able to search for a recommendation from the first user. If the second user is looking for a route that does not have the same destination and starting point as the original route, the first user's recommendation will not be returned in a search.

The following embodiments include systems and methods for indexing of routes using similarity hashing. An index may be created using minimum hashing. An index may be queried by minimum hashing and returning route attributes. A route may be created with the route attributes and an index of hashed links.

Figure 1:
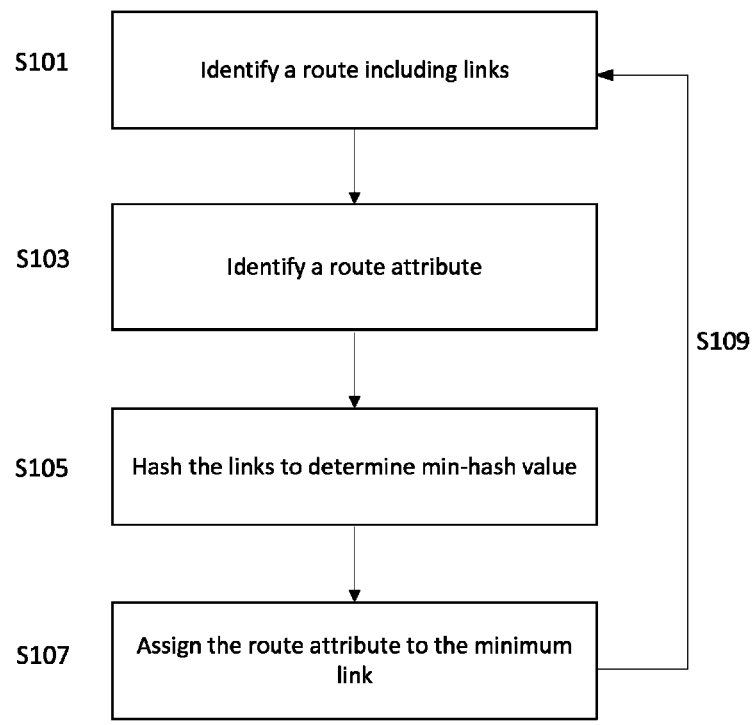
FIG. 1 illustrates an exemplary method for indexing of routes using similarity hashing.

FIG. 1 illustrates a method for indexing of routes using similarity hashing. As presented in the following sections, the acts may be performed using any combination of the components indicated in FIG. 7, FIG. 8, or FIG. 9. The following acts may be performed by a server 125, device 122, or a combination thereof. Additional, different, or fewer acts may be provided. The acts are performed in the order shown or other orders. The acts may also be repeated.

At act S101, a server 125 identifies a route. The term server 125 is used herein to collectively include the computing devices in a navigation system 121 for creating, maintaining, accessing, and updating a database(s) 123. The server 125 may be a host for a website or web service such as a mapping service and/or a navigation service. The mapping service may provide maps generated from the geographic data of the database 123, and the navigation service may generate routing or other directions from the geographic data of the database 123. Additional, different, or fewer components may be included.

The terms database and map database refer to a set of data or map data stored in a storage medium and may not necessarily reflect specific requirements as to the relational organization of the data or the map data. The database 123 may be a geographic database including road links and road attributes. The database may also contain one or more indexes.

The route may be stored in memory or transmitted to the server 125. The route may be a set of road links (or links or road segments) between a starting point and a destination. The route may be generated from or stored within a database 123 or map database. The database 123 may include geographic data used for traffic and/or navigation-related applications. The geographic data may include data representing a road network or system including road link data and node data. The road link data represent roads, and the node data represent the ends or intersections of the roads. The road link data and the node data indicate the location of the roads and intersections as well as various attributes of the roads and intersections. Other formats than road links and nodes may be used for the geographic data. The geographic data may include structured cartographic data or pedestrian routes.

The route identified may be a route that was transmitted by a device. The device may use positional circuitry to track the progress of a trip or route. The route may also be a route that has been stored in memory or manually inputted into the device. The route may be transmitted to the server 125 over a network 127. Multiple routes may be also be transmitted by the device.

The device may be a smart phone, a mobile phone, a personal digital assistant (PDA), a tablet computer, a notebook computer, a personal navigation device (PND), a portable navigation device, and/or any other known or later developed mobile device. The device may have inputs for users to specify a destination. Data including an address or destination may be entered through a keypad, touchpad, touchscreen, microphone or other device input. A device location may be derived using positional circuitry within the device such as GPS or GNSS or the device location may be entered using a device input.

At act S103, the server 125 identifies one or more route attributes. The route attribute may be stored in memory 301 or the database 123. The route attribute may be collected or received from a device through a network 127.

The route attribute may be anything that describes or adds additional data to the route. Route attributes may include facts or physical descriptions of the routs such as, for example, geographic coordinates, street names, address ranges, speed limits, turn restrictions at intersections, and/or other navigation related attributes (e.g., one or more of the road links is part of a highway or toll way, the location of stop signs and/or stoplights along the road links), as well as points of interest (POIs), such as gasoline stations, hotels, restaurants, museums, stadiums, offices, automobile dealerships, auto repair shops, buildings, stores, parks, etc.

Route attributes may also include opinions, annotations or user created observations such as scenic, windy, pretty, ugly, gritty, beautiful, slow, fast, bumpy, muddy, etc. Other observations, for example, may include views of a blank (where blank could be a lighthouse, historical buildings, POI, natural beauty etc.), wildlife or other natural observations, or activities such as great shopping, antiques, good food, etc.

Route attributes may also include data previously stored or collected. Personal navigation devices or devices in general may include profiles of the users. Data may include age, nationality, preferences, etc. This data may be included as route attribute and may be useful to help generate a preferred route (for instance a route that is taken by younger users more than older users).

The route attribute may also be received from a social application. For example, a device running an application such as a microblog website, social networking application, an instant message (IM) service, or other social application may collect data as the device starts, finishes, or travels a route. The device using positional circuity may associate this data with a road link or route. This data may then be transmitted to the server 125 as a route attribute. Receiving, collecting, or identifying route attributes from a social application may be beneficial to providing social navigation through a personal navigation device or autonomous vehicle.

The route attribute may also be received, collected, or identified from a website or web posting. Feeds, blogs, bulletin boards, forum, and other websites may identify a route and a route attribute. The server 125 may crawl, scan, or receive data from these sources and use this data as a route attribute.

For any route attribute, the source may be varied. The server 125 may collect, receive, or identify a route attribute from multiple different sources. For example, a user may state on a forum that a route the user took was "beautiful". A second user may send an instant message while traveling the route that mentioned the "awesome views". A third user may be prompted by a personal navigation device to rate a bicycle trip or drive. The third user's entry of "scenic" might be collected by the server 125 along with the remarks by the first and second users. This data may be aggregated into a single route attribute of "scenic" or the server 125 may separate each description into a different route attribute. Route attributes may also be distinct for a mode of travel such as by motorized vehicle, bicycle, motorcycle, by foot, among other modes of travel.

For the embodiment in FIG. 1, the one or more route attributes identified by the server 125 is that of a scenic value of a route. The server 125 has identified the route (and the links that make up the route) and a route attribute. In order to determine the scenic value of a route, the route may be compared to all other routes that have been considered scenic. How similar the route is to these stored scenic routes will determine the scenic value.

Figure 2:
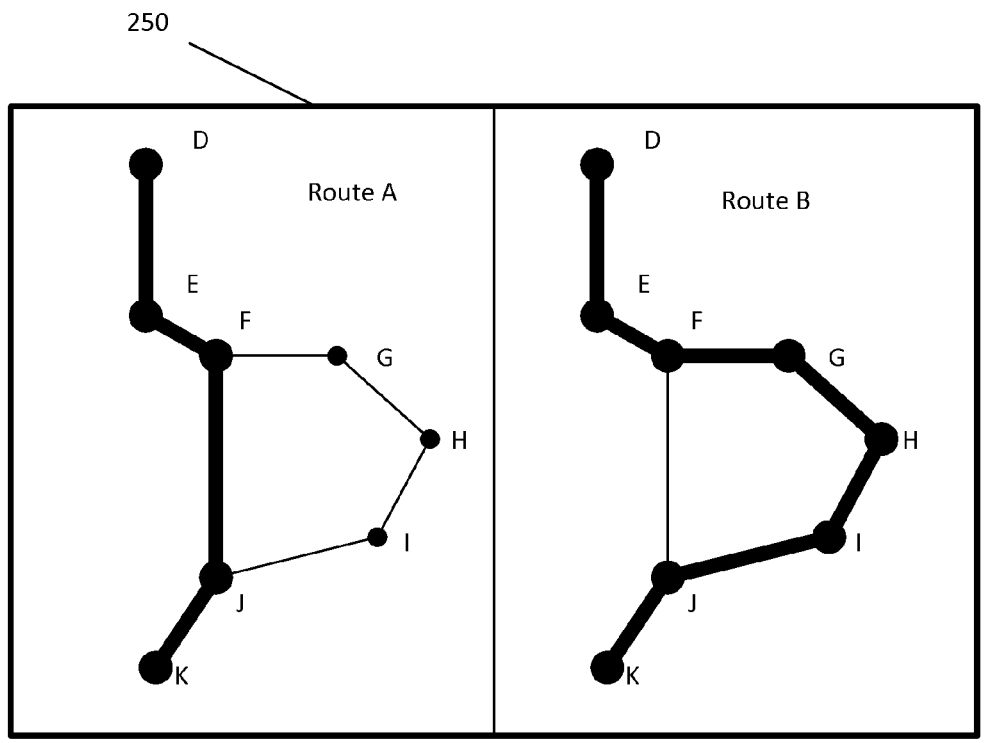
FIG. 2 illustrates an example of a map with two routes.

FIG. 2 illustrates a two versions of a map 250 with two routes A and B. The starting point is D; the destination is K. There are eight links shown; for example the link DE is the path between nodes D and E. The link GH is the path between nodes G and H. There are two routes shown outlined. Route A on the left is more of a direct route and encompasses the links DE, EF, FI, and JK. Route B on the right is a bit longer, and encompasses the links DE, EF, FG, GH, HI, IJ, and JK.

The server 125 may define the similarity of two routes A and B as:

$$sim(A, B) := \frac{|A \cap B|}{|A \cup B|} \qquad \text{EQUATION 1}$$

This gives a symmetric measure of how similar to routes are based on the links: the quotient of how many links they agree on and how many links totally involved. For example, if A contains the links {DE, EF, FJ, JK} and B contains {DE, EF, FG, GH, HI, IJ, JK}, the similarity may be calculated with:

$$sim(A, B) = \qquad \text{EQUATION 2}$$
$$\frac{|\{DE, EF, JK\}|}{|\{DE, EF, FG, GH, HI, IJ, JK, FJ\}|} = \frac{3}{8} = 37.5\%$$

The processor 300 is configured to use a big set of routes called scenic that may have been collected as all the routes users recommended as scenic. To measure how scenic a route R is, the server 125 may measure its value to be how similar it is to all the routes users recommended as scenic. The scenic value of a route may be defined as:

$$\text{value}(R) := \sum_{S \in SCENIC} sim(R, S) \qquad \text{EQUATION 3}$$

Then the server 125 sums up the similarity of the route R to all routes that are called scenic and define this to be the scenic value of R. This solution while mathematically not complex is very expensive (e.g., with respect to time, repetition, or computing resources) to process. There are millions of road links and the potential combinations to create different routes are endless. To have to compare each route to all other routes would potentially require hours or days of processing time. A quicker technique exists through hashing the links that make up the route.

At act S105, the server 125 hashes the links. Hashing is the transformation of a string of characters into a usually shorter fixed-length value or key that represents the original string. Hashing is used to index and retrieve items in a database 123 because it is faster to find the item using the shorter hashed key than to find it using the original value. A hash function H projects a value from a set with many (or even an infinite number of) members to a value from a set with a fixed number of (fewer) members. Hash functions may not be reversible. A hash function H might, for instance, be defined as y=H(x)=floor(x) mod 10, where x is a real number, y is [0, 9]. The hash function may store an output in a hash table. A hash function may be perfect in that it maps distinct elements with no collusions. A hash function for an embodiment may or may not be perfect.

The server 125 defines h to be a random, but fixed injective hash function, that hashes a link i to some real number h(i) between 0 and 1. For a route R, the server 125 defines h(R) to be:

$$h(R) := \underset{i \in R}{\arg\min}\, h(i) \qquad \text{EQUATION 4}$$

This is the link that takes the minimum hash value of all links in the route (minimum-hash). For a random hash function and two sets the following holds in general:

$$\mathbb{P}[h(A) = h(B)] = \frac{|A \cap B|}{|A \cup B|} = sim(A, B) \qquad \text{EQUATION 5}$$

That means that the probability for a random hash function for the minimum-hash values of two sets A and B to collide equals to the size of the intersection divided by the size of the union of the two sets A and B.

Now, the server 125 defines $v^h(i)$ to be the number of all scenic routes S that have i as the minimizing link with respect to h.

$$v^h(i) := |\{S | h(S) = i\}| \qquad \text{EQUATION 6}$$

Since h is a random hash function, $v^h(i)$ is a random value with respect to the same underlying probability space. For a route R, the scenic value of R equals to expectation of $v^h(h(R))$ with respect to the selection of the hash function h, i.e.

$$\text{value}(R) = \mathbb{E}[v^h(h(R))] \qquad \text{EQUATION 7}$$

$$\mathbb{E}[v^h(h(R))] \qquad \text{EQUATION 8}$$

$$\mathbb{E}\left[\Sigma_S \begin{cases} 1 & \text{if } h(S) = h(R) \\ 0 & \text{otherwise} \end{cases}\right] \qquad \text{EQUATION 9}$$

$$\sum_S \mathbb{E}\left[\begin{cases} 1 & \text{if } h(S) = h(R) \\ 0 & \text{otherwise} \end{cases}\right] \qquad \text{EQUATION 10}$$

$$\sum_S \mathbb{P}[h(S) = h(R)] \qquad \text{EQUATION 11}$$

$$\sum_S sim(R, S) \qquad \text{EQUATION 12}$$

$$\text{value}(R) \qquad \text{EQUATION 13}$$

In equation 9, v is replaced by its definition using a binary indicator function. Linearity of summation is used in equation 10. The expectation is unrolled in the equation 11. Then, equation 5 is applied with A=R and B=S (for each S) to yield equation 12 and the definition of value is applied to yield equation 13.

At act S107 the route attribute, for example scenic, is assigned to the minimum link. By collecting and repeating this method including identifying and hashing, an index of links and route attributes is generated. To create an index for $v^h(i)$, at act S109, the server 125 identifies the scenic routes, hashes the links, computes the link that has the minimum hash and then aggregates the number of such "hits" for each link, i.e. how much of the route attribute was assigned to the link as the route attribute value for that link. Indexes may be created for multiple route attributes.

Since the minimum hashing is a random process, the value may scatter a bit. To improve the quality of the estimate, multiple independent hash-functions and multiple independent indexes may be used. The average of these indexes may give a better estimate than a single pass through a single hash function. The quality of the estimate may be computed using the standard error of the mean. Jackknife or Bootstrapping. Standard error of the mean is a method to compute how far an estimated mean differs from the true mean. Jackknife is a resampling technique especially useful for variance and bias estimation. Bootstrapping may refer to any test or metric that relies on random sampling with replacement. Bootstrapping allows assigning measures of accuracy (defined in terms of bias, variance, confidence intervals, prediction error or some other such measure) to sample estimates.

To create multiple indexes, the method in FIG. 1 is repeated with different hash-functions. Different hash-functions will return different minimum values for the links; averaged together the aggregate of the number of "hits" will give a better estimate for the route attribute. In certain embodiments, ten or more different hash-functions are used to create ten or more independent indexes. The ten or more independent indexes are then averaged to provide a single master index.

Figure 3:
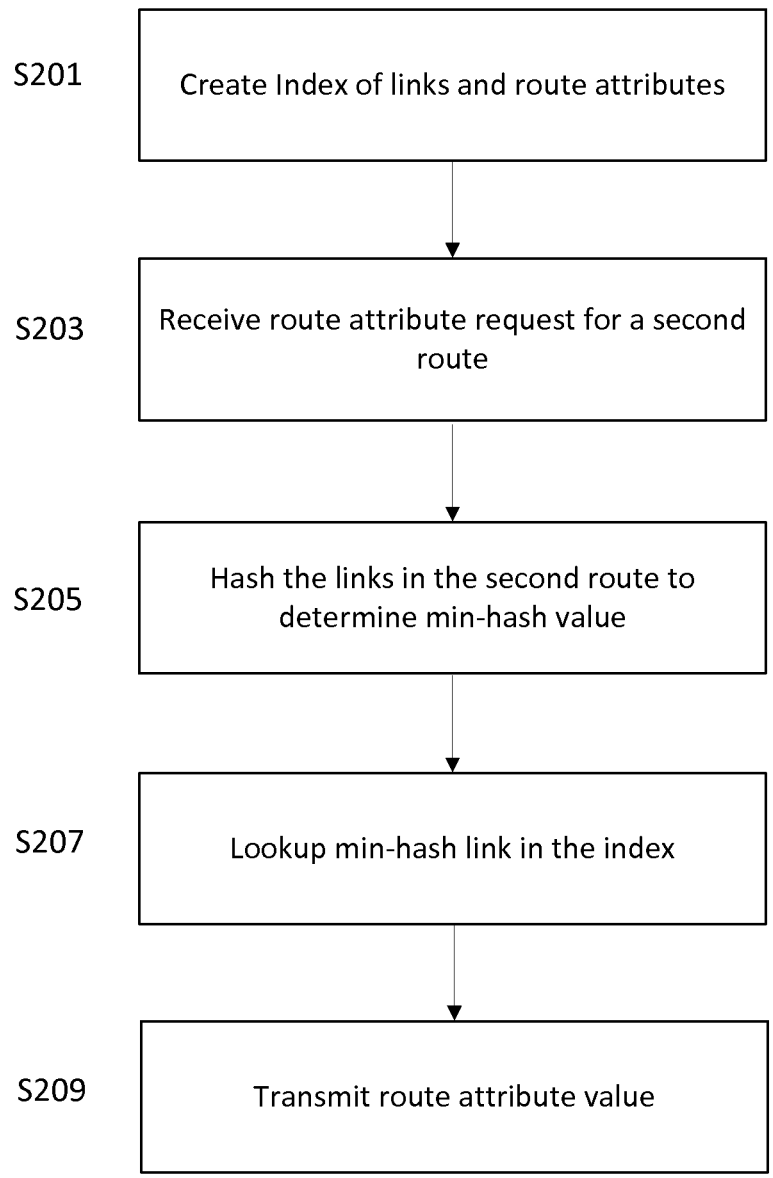
FIG. 3 illustrates an exemplary method for querying an index for routes.

FIG. 3 illustrates a method for querying an index for a route attribute, for example scenic routes. As presented in the following sections, the acts may be performed using any combination of the components indicated in FIG. 7, FIG. 8, or FIG. 9. The following acts may be performed by a server 125, device 122, or a combination thereof. Additional, different, or fewer acts may be provided. The acts are performed in the order shown or other orders. The acts may also be repeated.

Figure 4:
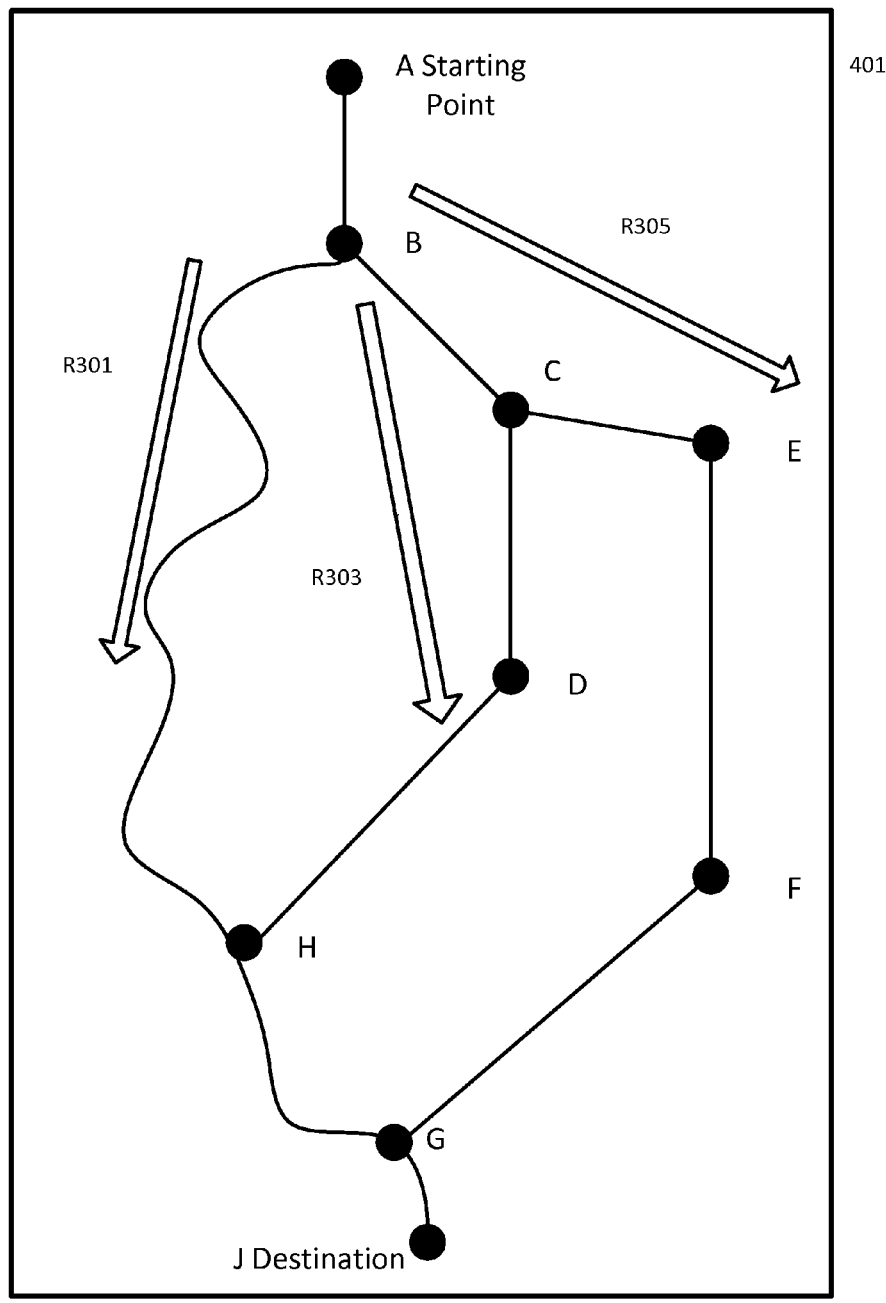
FIG. 4 illustrates an example of a map with three routes.
Figure 5:
FIG. 5 illustrates an example index.

To query the value, the server 125 computes the minimum hash for the candidate route and then query the index. FIG. 4 illustrates a map 401 with three example routes R301, R303, R305 and multiple links (AB, BC, CE, EF, FG, GJ, BH, CD, DH, HG). FIG. 5 illustrates an example of an index which includes links from FIG. 4 and a value for route attribute 1 and route attribute 2.

At act S201, an index is created including one or more links and an aggregation of a route attribute. As mentioned, an index may be created by going through one or more routes, computing the link that has the minimum hash and aggregating the number of hits for each link as the route attribute value for that link. FIG. 5 illustrates an example index. FIG. 5 includes an index with fields for a link, a link ref number, a link hash value, a route attribute value 1 and a route attribute value 2. An index may not include the link name, but rather just refer to the link as the link ref number. The index in FIG. 5 lists the links from FIG. 4 in the link column. The index or indexes may be stored in memory 301 or in the database 123.

At act S203, the server 125 receives a route attribute request regarding a second route. The second route includes a number of road links. The request may contain the road links, or the server 125 may query the database 123 to determine which road links are included within the second route. FIG. 4 illustrates three routes R301, R303, and R305. Each route R301, R303, and R305 are made up of a series of links. R301 includes links AB, BH, HG, and GJ. R303 includes AB, BC, CD, DH, HG, and GJ. R305 includes AB, BC, CE, EF, FG, and GJ. For this example method, R301 will represent the second route.

At act S205, the server 125 hashes the links included in the second route. As mentioned above, the server 125 defines h to be a random, but fixed injective hash function, that hashes a link i to some real number h(i) between 0 and 1. The hash function in the query process is the same hash function that was used in the index generation process. The index in FIG. 5 illustrates the hash values for multiple links. For the second route the links AB, BH, HG, and GJ will be hashed. As shown in FIG. 5, the hash values for these links are 0.2200, 0.0524, 0.8930, 0.6553 respectively. For a route R, the server 125 defines h(R) to be:

$$h(R) := \operatorname*{argmin}_{i \in R} h(i) \qquad \text{EQUATION 13}$$

This is the link that takes the minimum hash value of all links in the second route (minimum-hash). The minimum-hash for the second route is 0.0524 which corresponds to BH.

At act S207, the minimum link BH (that is representative of the minimum hash value) is looked up in the index. The index may list a route attribute value for the minimum link. As illustrated by FIG. 5, the index shows that the value for route attribute 1 (scenic in this example) is eight.

At act S209, the route attribute value is transmitted to the device. In this example the route attribute is eight. The value may represent how similar a route is to other routes which have been described or labeled by the route attribute. Different value scales may be used for different route attributes. A lower value may be better than a higher score. In the example illustrated by FIGS. 3-5, a higher scenic value was preferred. In a different embodiment, a lower value such as how bumpy a route is may be preferred.

By transmitting a route and querying an index, the device may ascertain the properties of a selected route. If the device does not have a known route, but a starting point and a destination, the device may request a route from the server 125 that meets a requested route attribute.

Figure 6:
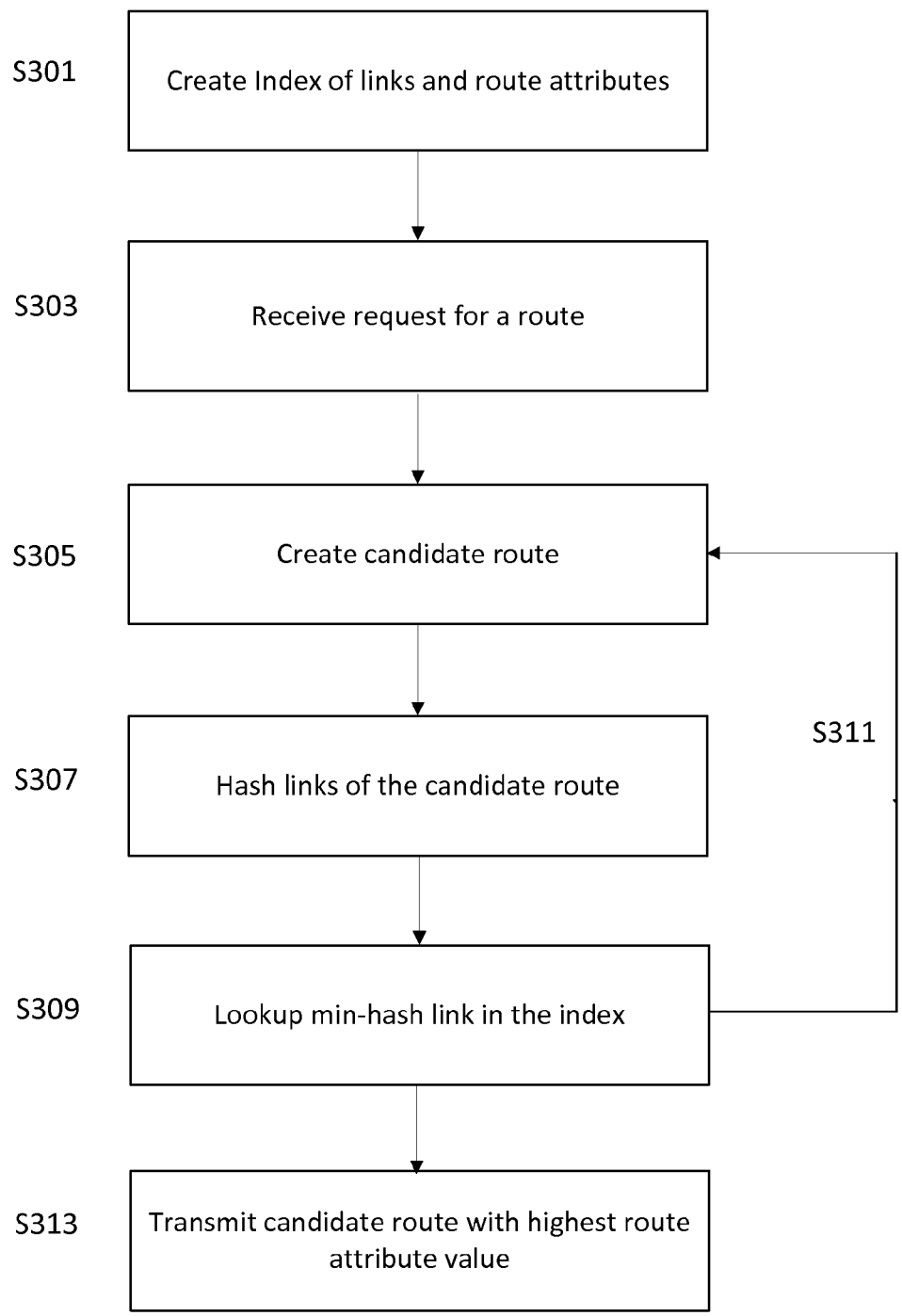
FIG. 6 illustrates an exemplary method for finding a route that is similar to other routes.

FIG. 6 illustrates a method for finding a route that is similar to other routes, for example scenic routes. As presented in the following sections, the acts may be performed using any combination of the components indicated in FIG. 7, FIG. 8, or FIG. 9. The following acts may be performed by a server 125, device 122, or a combination thereof. Additional, different, or fewer acts may be provided. The acts are performed in the order shown or other orders. The acts may also be repeated.

To find the similarity of a route to other scenic routes, the server 125 may find the route with the highest scenic value. As mentioned above, the server 125 may compute the scenic value of a route by querying an index. In order to find the route with the highest scenic value, the server 125 may use a gradient local search.

At act S301, the server 125 creates an index including links and a route attribute. FIG. 4 illustrates three example routes and multiple links. FIG. 5 illustrates an example of an index which includes links from FIG. 4. FIG. 5 includes an index 501 with fields for a link, a link ref no., a link hash value, a route attribute value 1 and a route attribute value 2. An index may not include the link name, but rather just refer to the link as the link ref no. The index in FIG. 5 lists the links from FIG. 4 in the link column.

At act S303, the server 125 receives a request for a route. The request for a route includes a starting point and a destination. FIG. 4 illustrates a starting point A and a destination J. The request also includes a route attribute. For this example, the route attribute may be the scenic value of a route.

At act S305, the server 125 creates one or more candidate routes. The candidate route may be generated from or stored within a database 123. The database 123 may include geographic data used for traffic and/or navigation-related applications. The geographic data may include data representing a road network or system including road link data and node data. The road link data represent roads, and the node data represent the ends or intersections of the roads.

FIG. 4 illustrates ten links (AB, BC, CD, CE, EF, GF, DH, BH, HG, and GJ). There are three possible routes: R301 includes links AB, BH, HG, and GJ. R303 includes AB, BC, CD, DH, HG, and GJ. R305 includes AB, BC, CE, EF, FG, and GJ. For this example, the candidate route may be R305 (links=AB, BC, CE, EF, FG, and GJ).

At act S307, the server 125 hashes the links that make up the candidate route. The server 125 may use a hash function as mentioned above to return the following respective values for the links AB, BC, CE, EF, FG, and GJ: 0.2200, 0.0330, 0.0111, 0.6790, 0.9343, 0.6553. The minimum hash for R305 is 0.0111 (link CE).

At act S309, Link CE is queried in the index which returns a value of one for route attribute one. At act S311, the acts S305, S307, and S309 are repeated. The server 125 may generate a different candidate route. For this example, the second candidate route may be R303 which is made up of links AB, BC, CD, DH, HG, and GJ. The server 125 hashes the links to return the following values: 0.2200, 0.0330, 0.4500, 0.0443, 0.8930, and 0.6553. The minimum hash for R303 is 0.0330 (link BC). Link BC is looked up in the index which returns a value of one for route attribute one. The server 125 may then select a different candidate route. For this example, the third candidate route may be R301. R301 contains links AB, BH, HG, and GJ, which when hashed return the hash values of 0.2200, 0.0524, 0.8930, and 0.6553 respectively. The minimum hash for R301 is 0.0524 (Link BH). Link BH is looked up in the index which returns a value of eight for route attribute one. The server 125 may then select a different candidate route until all potential routes are exhausted or the server 125 reaches a predefined limit. The server 125 may use a gradient search strategy to limit the number of candidate routes. The server 125 may use multiple types of search strategies to limit the number of candidate routes to be calculated.

At act S313, the server 125 transmits the candidate route which has the highest (or most) route attribute. In the example shown in FIGS. 4-5, the candidate route which has the highest route attribute is R301. This may indicate that R301 is most similar of the candidate routes to routes that have described or marked as being scenic (if route attribute one represents scenic value).

For certain route attributes, the server 125 may not select the candidate route which has the highest route attribute value. For example, the most popular route is very similar to the fastest route. Hence, as a start point for the local search, the server 125 selects the fastest route (or as an alternative one of the alternative almost fastest routes).

A search algorithm may blacklist each of the links of the current route one-by-one and re-compute the fastest route avoiding that link and compute its scenic. The server 125 then selects the blacklisted link where the scenic value grows the biggest and keep that blacklisted link also to be avoided in any succeeding search step. The server 125 stops the search when it returns a solution where blacklisting a link does not improve the scenic value anymore.

This is just one example of a local search algorithm. The search may be improved by better guidance at the search step. For example, the server 125 might blacklist the link with the lowest value $v^h$ for the different hash functions because it is likely the link is part of the least number of scenic routes.

Figure 7:
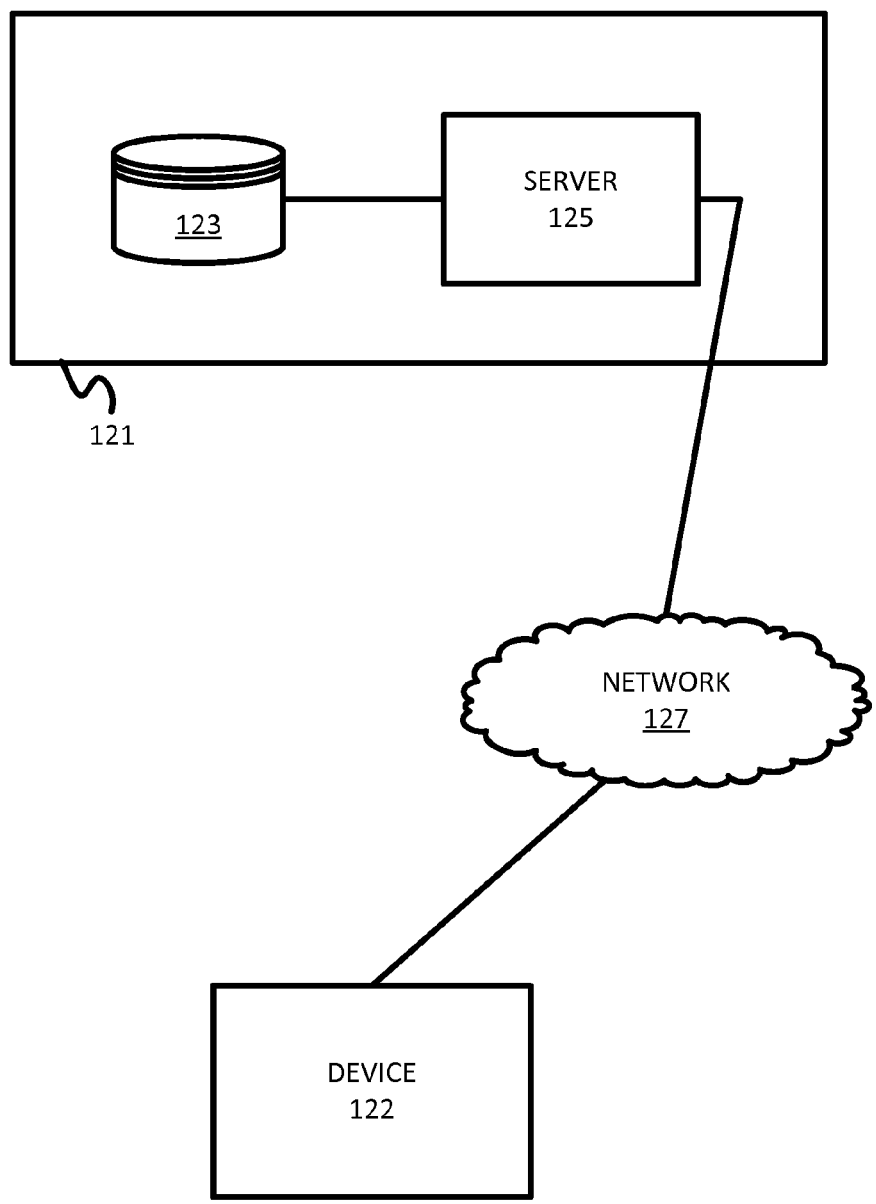
FIG. 7 illustrates an exemplary system for indexing routes using similarity hashing.

FIG. 7 illustrates an example system for indexing routes, for example scenic and popular routes using similarity hashing. The system 120 includes a navigation system 121, one or more devices 122 (navigation devices), and a network 127. Additional, different, or fewer components may be provided. The system 121 includes a server 125 and one or more databases 123. The term database and map database refers to a set of data or map data stored in a storage medium and may not necessarily reflect specific any requirements as to the relational organization of the data or the map data. The database 123 may be a geographic database including road links. The server 125 may maintain multiple map databases, including a master copy of the database 123 that may be the most current or up to date copy of the database 123 and one or more past versions of the database 123. In addition, the device 122 may store a local copy of the database 123. In one example, the local copy of the database 123 is a full copy of the geographic database, and in another example, the local copy of the database 123 may be a cached or partial portion of the geographic database based on the location of the device 122.

Figure 8:
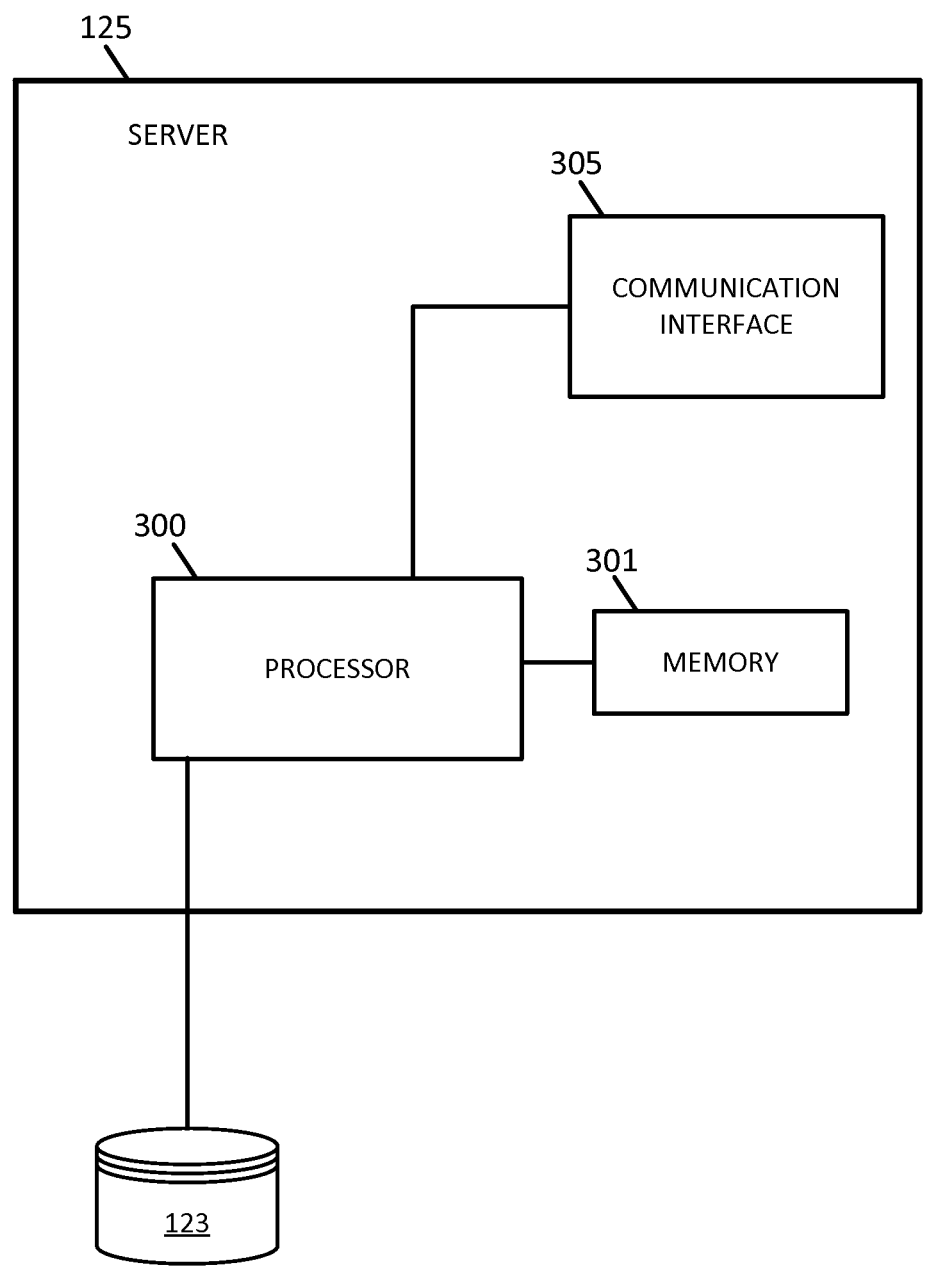
FIG. 8 illustrates an exemplary server of the system of FIG. 7.

FIG. 8 illustrates an example server 125. The server 125 includes a processor 300, a communication interface 305, and a memory 301. The server 125 may be coupled to a database 123. Additional, different, or fewer components may be provided in the server 125. The server 125 may be a host for a website or web service such as a mapping service and/or a navigation service. The mapping service may provide maps generated from the geographic data of the database 123, and the navigation service may generate routing or other directions from the geographic data of the database 123.

The term server is used herein to collectively include the computing devices for creating, maintaining, indexing, and updating the one or more databases 123 and indexes. Any computing device may be substituted for the device 122. The computing device may be a host for a website or web service such as a mapping service or a navigation service. The mapping service may provide maps generated from the geographic data of the database 123, and the navigation service may calculate routing or other directions from the geographic data of the databases 123.

The server 125 or processor 300 may be configured to identify a route. The route may be stored in memory 301 or the database 123. The route may be received through the communication interface. The route may be received from the device through the network 127. The server 125 or processor 300 may be configured to identify a route attribute. The route attribute may be stored in memory 301 or the database 123. The route attribute may be received through the communication interface. The route attribute may be anything that describes or adds additional data to the route. Route attributes may also include opinions or user created observations. Route attributes may also include data previously stored or collected. The route attribute may also be received from a social application. The route attribute may also be received, collected, or identified from a website or web posting. The server 125 may identify a route by a route identification number or designation. The server 125 may also identify a route by a list of route links (or links or road segments) that constitute the route. The processor 300 may store a list of route links in memory 301 or retrieve the links from the map database 123.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network 127, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The database 123 may include geographic data used for traffic and/or navigation-related applications. The geographic data may include data representing a road network or system including road link (or link or road segment) data and node data. The road link data represent roads, and the node data represent the ends or intersections of the roads. The road link data and the node data indicate the location of the roads and intersections as well as various attributes of the roads and intersections. Other formats than road link and nodes may be used for the geographic data. The geographic data may include structured cartographic data or pedestrian routes.

The database 123 may also include other attributes of or about the roads such as, for example, geographic coordinates, street names, address ranges, speed limits, turn restrictions at intersections, and/or other navigation related attributes (e.g., one or more of the road links is part of a highway or toll way, the location of stop signs and/or stoplights along the road links), as well as points of interest (POIs), such as gasoline stations, hotels, restaurants, museums, stadiums, offices, automobile dealerships, auto repair shops, buildings, stores, parks, etc. The database 123 may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The processor 300 is configured to hash the one or more links of the route. Hashing is the transformation of a string of characters into a usually shorter fixed-length value or key that represents the original string. A hash function H might, for instance, be defined as y=H(x)=floor(x) mod 10, where x is a real number, y is [0,9. The hash function may store an output in a hash table. The processor 300 defines h to be a random, but fixed injective hash function, that hashes each link i (from the one or more links of the route) to some real number h(i) between 0 and 1.

The processor 300 is configured to determine the minimum hash and the associated link. The route attribute is assigned to this link and stored in an index for the route attribute. The index may be stored in memory 301 or the database 123.

The processor 300 is configured to receive a route attribute request regarding a second route. The request may come from the database 123 or memory 301, or may be received through the network 127. The request may be received from the device through the network 127.

The network 127 may include wired networks, wireless networks, or combinations thereof. The wireless network may be a cellular telephone network, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to TCP/IP based networking protocols.

The processor 300 is configured to hash the one or more links of the second route. The processor 300 is configured to compute the second route's link that has the minimum link hash value. The processor 300 is configured to query the index for that link and return a route attribute value. The processor 300 is configured to transmit the route attribute using the communication interface. The communication interface may transmit the route attribute to the device.

Figure 9:
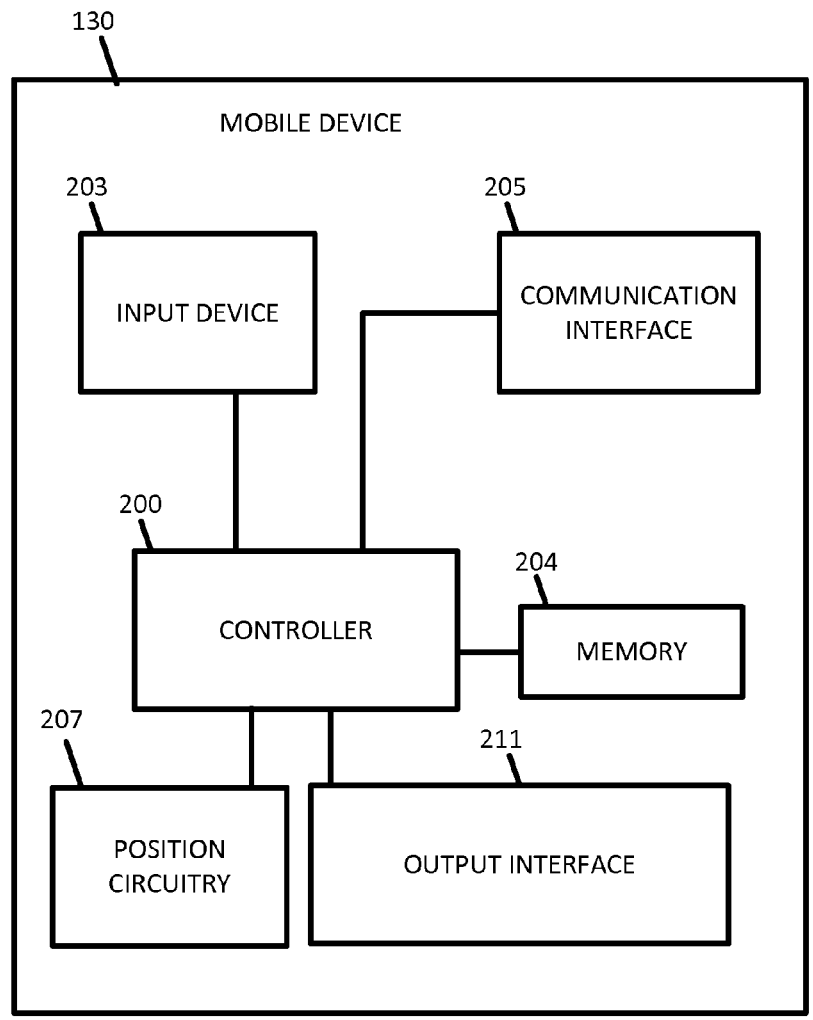
FIG. 9 illustrates an exemplary device of the system of FIG. 7.

FIG. 9 illustrates a device configured to request, transmit and/or receive a route. The device 122 may be referred to as a navigation device. The device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the device 122. The device 122 is a smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device, or the device may be integrated into a vehicle.

The device 122 may be configured to execute routing algorithms to determine a route to travel along a road network from an origin location to a destination location in a geographic region. The device may be configured to transmit links (or road segments) to the server 125 through the network 127. The device may be configured to hash the links before sending the minimum hash link to the server 125. The device 122 may then provide the end user with information about the route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on.

The device 122 may be integrated into an autonomous vehicle or a highly assisted driving (HAD) vehicle. The device 122 may be configured as a navigation system for an autonomous vehicle or a HAD. An autonomous vehicle or HAD may take route instruction based on the routes (and route attributes) provided to the device 122 by the server 125.

As described herein, an autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles.

The autonomous or highly automated driving vehicle may optically track and follow lane markings or guide markings on the road.

An autonomous of highly automated driving vehicle may use the index of routes as a method of social navigation; allowing a user or device to navigate with the help of other people who may have previously navigated a route or area.

The positioning circuitry 207, which is an example of a positioning system, is configured to determine a geographic position of the mobile device 122. The movement circuitry 208, which is an example a movement tracking system, is configured to determine movement of a mobile device 122. The position circuitry 207 and the movement circuitry 208 may be separate systems, or segments of the same positioning or movement circuitry system. In an embodiment, components as described herein with respect to the mobile device 122 may be implemented as a static device.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The device may be configured to transmit a request to the server 125. The request may include a route or a route attribute. The request may include a starting point and a destination. The starting point may be determined using positioning circuitry 207. The starting point or destination may be inputted using the input device 203. The request may be transmitted using the communication interface.

The device may be configured to transmit a starting point, a destination, and a preferred route attribute to the server 125. The preferred route attribute may be the scenic value of the route. The scenic value of the route may be a representation of how similar the route is to one or more previously scenic described routes.

The device may be configured to perform routing and hashing. Routing and hashing may also be performed by the processor 300 in the server 125. To create a route the starting point and destination are connected using one or more road links (or links or road segments). Each road link may be designated by a link reference number. The road links may be stored in memory 204 or a partial (or full) database 123 either in the device or on the server 125.

The device may be configured to create one or more candidate routes that connect the starting point to the destination. For each candidate route, the device hashes each road link that makes up the route. The controller defines h to be a random, but fixed injective hash function that hashes each link i (from the one or more links of the candidate route) to some real number h(i) between 0 and 1.

The minimum hash value (and associated link) is transmitted to the server 125 to query an index of links and route attributes. Using one or more links for the candidate routes, a query of the index returns route attributes for the one or more candidate routes. The server may select the candidate route with the highest route attribute and transmit the route attribute. The device receives the route attribute for the candidate route with the highest route attribute. The route attribute may be displayed on the device using the output interface 211.

A partial or full index may be stored locally on a device. In such an embodiment, the device would perform the lookup. The device may still receive updates from the server 125.

The term "computer-readable medium" includes a single medium or multiple media, such as a centralized or distributed database 123, and/or associated caches and servers that store one or more sets of instructions. The term "computer-readable medium" shall also include any medium that is capable of storing, encoding or carrying a set of instructions for execution by a processor 300 or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   identifying a route, wherein the route includes one or more links;
   identifying a route attribute, wherein the route attribute describes the route;
   generating a hash value for each of the one or more links;
   identifying a minimum link of the one or more links with a minimum hash value;
   assigning the route attribute to the minimum link in an index containing a plurality of links for a roadway network; wherein the index is configured to provide a requested route that is described as the route attribute to a navigation device.

2. The method of claim 1, further comprising:
   receiving a second route, wherein the second route includes one or more second links;
   generating hash values for each of the one or more second links;
   identifying a minimum second link which corresponds to a minimum second link hash value for the second route; and
   assigning the route attribute to the second route when the minimum second link is the minimum link.

3. The method of claim 1, wherein the route attribute is a popularity of the route.

4. The method of claim 1, wherein the route attribute is a scenic value of the route.

5. The method of claim 1, wherein the route attribute is received from a user profile.

6. The method of claim 1, wherein the route attribute is received from a social media application.

7. The method of claim 1,
   wherein the index aggregates how often the route attribute is assigned to the minimum link as a route attribute value.

8. The method of claim 7, further comprising:
   receiving a route attribute request regarding a third route; wherein the third route includes one or more third links;
   generating hash values for each of the third links;
   identifying a minimum third link hash value;
   matching the minimum third link hash value to a minimum third link; and
   transmitting the route attribute value that corresponds to the minimum third link in the index.

9. The method of claim 7, further comprising:
   generating more than one indices by using more than one different hash functions to generate more than one minimum link hash value.

10. The method of claim 9, further comprising:
    averaging a route attribute value from the more than one indices.

11. The method of claim 7, further comprising:
    receiving a request including a route attribute, a starting point, and a destination;
    generating one or more candidate route; wherein the one or more candidate routes include the starting point and the destination; wherein the candidate routes include one or more candidate links;
    generating a hash value for each of the one or more candidate links;
    identifying a minimum candidate link with a minimum hash value for each candidate route; and
    transmitting a chosen candidate route that is the candidate route which has the minimum candidate link with a highest route attribute value found in the index.

12. The method of claim 11, wherein the chosen candidate route is the candidate route which has the minimum candidate link with the second highest route attribute value found in the index.

13. The method of claim 11, wherein each candidate route of the one or more candidate routes differ by one candidate link.

14. An apparatus comprising:
    at least one processor; and
    at least one memory including computer program code for one or more programs; the at least one memory and the computer program code configured to, with the at least one processor, cause the apparatus to at least perform:
identify a route including one or more links;
identify a route attribute that describes the route;
generate a hash value for each of the one or more links;
identify a minimum link with a minimum hash value; and
assign the route attribute to the minimum link in an index containing a plurality of links for a roadway network;
wherein the index is configured to provide a requested route that is described as the route attribute to a navigation device.

15. The apparatus of claim 14, wherein
the index aggregates how often the route attribute was assigned to the minimum link as the route attribute value.

16. The apparatus of claim 14, wherein the route attribute is a popularity of the route.

17. The apparatus of claim 15, wherein the at least one memory and computer program code are configured to cause the apparatus to further perform:
generate more than one indices by using more than one hash function to generate more than one minimum link hash value for each of the one or more links.

18. The apparatus of claim 17, wherein the at least one memory and computer program code are configured to cause the apparatus to further perform:
average a route attribute value from the more than one indices.

19. A non-transitory computer readable medium including instructions that when executed are operable to:
receive a traveled route, wherein the traveled route includes one or more links;
receive a route attribute from a navigation device that traveled the traveled route, wherein the route attribute describes the traveled route;
generate a hash value for each of the one or more links;
identify a minimum link with a minimum hash value; and
assign the route attribute to the minimum link in an index containing a plurality of links for a roadway network;
wherein the index is configured to provide a requested route that is described as the route attribute to a navigation device.

20. The non-transitory computer readable medium of claim 19, wherein the route attribute is a popularity of the traveled route.

* * * * *